United States Patent
Kou et al.

(10) Patent No.: US 12,460,039 B2
(45) Date of Patent: Nov. 4, 2025

(54) BLOCK COPOLYMER INTERMEDIATE, BLOCK COPOLYMER, AND METHODS FOR PRODUCING SAME

(71) Applicant: DIC Corporation, Tokyo (JP)

(72) Inventors: Youki Kou, Sakura (JP); Hisakazu Tanaka, Sakura (JP)

(73) Assignee: DIC CORPORATION, Tokyo (JP)

( * ) Notice: Subject to any disclaimer, the term of this patent is extended or adjusted under 35 U.S.C. 154(b) by 739 days.

(21) Appl. No.: 17/788,049

(22) PCT Filed: Dec. 17, 2020

(86) PCT No.: PCT/JP2020/047077
§ 371 (c)(1),
(2) Date: Jun. 22, 2022

(87) PCT Pub. No.: WO2021/140860
PCT Pub. Date: Jul. 15, 2021

(65) Prior Publication Data
US 2023/0093202 A1 Mar. 23, 2023

(30) Foreign Application Priority Data
Jan. 7, 2020 (JP) .................................. 2020-000856

(51) Int. Cl.
*C08F 297/02* (2006.01)
*B01J 19/00* (2006.01)
(Continued)

(52) U.S. Cl.
CPC ....... *C08F 297/026* (2013.01); *B01J 19/0093* (2013.01); *C08F 212/32* (2013.01);
(Continued)

(58) Field of Classification Search
CPC .. C08F 220/14; C08F 212/08; C08F 293/005; C08F 293/00; C08F 8/14; B01J 19/0093
See application file for complete search history.

(56) References Cited

FOREIGN PATENT DOCUMENTS

JP 2010-180353 A 8/2010

OTHER PUBLICATIONS

Goseki et al. Polymers 2017, 9, 470 (Year: 2017).*
(Continued)

*Primary Examiner* — Mark S Kaucher
(74) *Attorney, Agent, or Firm* — WHDA, LLP

(57) ABSTRACT

The block copolymer intermediate represented by the following general formula (1) or (2) is used. In the formulae, $R^1$ and $R^7$ each independently represent a polymerization initiator residue, $R^2$ and $R^8$ each independently represent an aromatic group or an alkyl group, $Y^1$ represents a polymer block of (meth)acrylic ester, $Y^2$ represents a polymer block of styrene or a derivative thereof, and m and n each independently represent in an integer from 1 to 5. In the formulae, $R^3$ represents an alkylene group having 1 to 6 carbon atoms, L represents a linking group, $R^4$ represents a hydrogen atom, an alkyl group having 1 to 6 carbon atoms, or an aromatic group, and $R^5$ and $R^6$ each independently represent a hydrogen atom or an alkyl group having 1 to 6 carbon atoms.

(Continued)

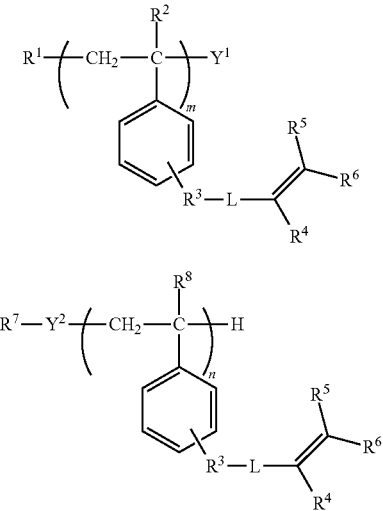

3 Claims, 1 Drawing Sheet

(51) Int. Cl.
*C08F 212/32* (2006.01)
*C08F 220/14* (2006.01)
*C08F 265/06* (2006.01)

(52) U.S. Cl.
CPC .......... *C08F 220/14* (2013.01); *C08F 265/06* (2013.01); *B01J 2219/00889* (2013.01); *C08F 2438/00* (2013.01); *C08F 2800/20* (2013.01)

(56) References Cited

OTHER PUBLICATIONS

Ito S. et al., Successive Synthesis of Multiarmed and Multicomponent Star-Branched Polymers by New Iterative Methodology Based on Linking Reaction between Block Copolymer In-Chain Anion and a-Phenylacrylate-Functionalized Polymer, Macromolecular Chemistry and Physics, vol. 216, No. 14, Jun. 5, 2015, pp. 1523-1533, XP093030233, DE ISSN: 1022-1352, DOI:10.1002/macp. 201500148. (11 pages); cited in EP Office Action dated Dec. 20, 2023.

Goseki et al., "Precise Synthesis of Novel Star-Branched Polymers Containing Reactive Poly(1,4-divinylbenzene) Arm(s) by Linking Reaction of Living Anionic Poly(1,4-divinylbenzene) with Chain-(α-Phenyl acrylate)-Functionalized Polymers", Macromolecules, Apr. 15, 2015, vol. 48, pp. 2370-2377, Schemes 1-6, cited in ISR (8 pages).

Ito et al., "Precise Synthesis of New Exactly Defined Graft Copolymers Made up of Poly(alkyl methacrylate)s by Iterative Methodology Using Living Anionic Polymerization", Macromolecules, Nov. 2, 2015, vol. 48, pp. 8307-8314, Scheme 4, cited in ISR (8 pages).

Yoo et al., "Precise Synthesis of Dendrimer-like Star-Branched Poly(tert-butyl methacrylate)s and Their Block Copolymers by a Methodology Combining α-Terminal-Functionalized Living Anionic Polymers with a Specially Designed Linking Reaction in an Iterative Fashion", Macromolecules, Dec. 9, 2011, vol. 45, pp. 100-112, Scheme 3, cited in ISR (13 pages).

International Search Report dated Feb. 16, 2021, issued in counterpart International Application No. PCT/JP2020/047077 (3 pages).

* cited by examiner

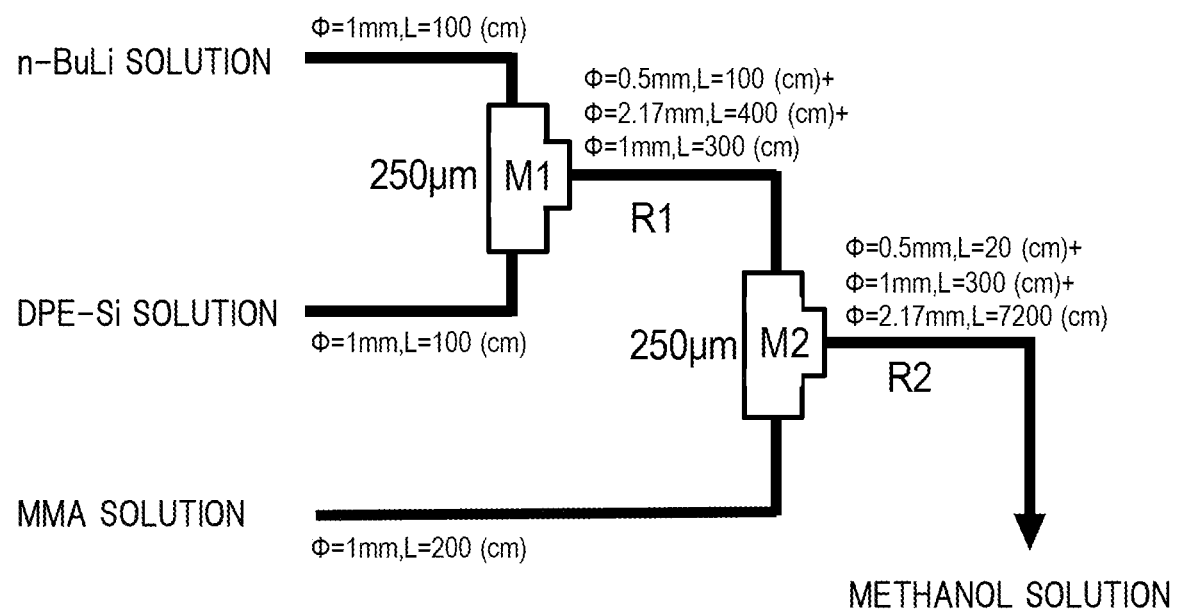

BLOCK COPOLYMER INTERMEDIATE, BLOCK COPOLYMER, AND METHODS FOR PRODUCING SAME

TECHNICAL FIELD

The present invention relates to a block copolymer intermediate, the block copolymer, and methods for producing the intermediate and the block copolymer.

BACKGROUND ART

In the semiconductor industry, in which devices are increasingly more highly integrated with finer designs, new miniaturization technologies to replace optical lithography are desired. Among such technologies, the Directed Self-Assembly (DSA) technology has attracted attention, in which a fine resist pattern is formed by artificially controlling a self-assembly phenomenon in which a polymer forms a periodic nanostructure. In recent years, the DSA technology using a diblock copolymer as a self-assembling material has been studied, and many studies have been reported on a polystyrene-polymethacrylate block copolymer and the like in terms of composition ratio and molecular weight. However, the molecular weight and the degree of dispersion of a block copolymer are directly related to pattern size and accuracy, and accordingly there is a problem in that even a slight deviation during synthesis significantly affects performance. Therefore, in the development of a block copolymer for the DSA, it is essential to precisely control the molecular weight and the degree of dispersion of blocks.

Examples of a method for obtaining a block copolymer having a low degree of dispersion and a narrow molecular weight distribution include living anionic polymerization (for example, see PTL 1). An initiation method in which a first monomer is polymerized using alkyl lithium as an initiator and then a second monomer is sequentially polymerized to synthesize a block copolymer exhibits a simple process, but has a problem in that even a very small amount of moisture and oxygen affects a reaction, which causes difficulties in precisely controlling sufficient molecular weight distribution. Hence, it is difficult to obtain a block copolymer in which the molecular weight and the degree of dispersion of polymer blocks are precisely controlled. The initiation method also has a problem in that the selectivity of a first monomer and a second monomer is limited.

Under these circumstances, a block copolymer applicable to the DSA technology and a method for producing the block copolymer have been called for.

CITATION LIST

Patent Literature

PTL 1: Japanese Unexamined Patent Application Publication No. 2010-180353

SUMMARY OF INVENTION

Technical Problem

An object of the present invention is to provide a block copolymer having a narrow molecular weight distribution and being applicable to the DSA technology, a block copolymer intermediate, and methods for producing the block copolymer and the intermediate.

Solution to Problem

The inventors of the present invention have conducted extensive studies to achieve the object and found that, by using a block copolymer intermediate having a specific structure to synthesize a block copolymer, a block copolymer applicable to the DSA technology can be obtained. The inventors have also found that the use of a specific production method makes it possible to efficiently produce the block copolymer intermediate and the block copolymer, and thus the present invention has been accomplished.

Specifically, the present invention provides a block copolymer intermediate, the intermediate being represented by general formula (1) or (2).

[Chem. 1]

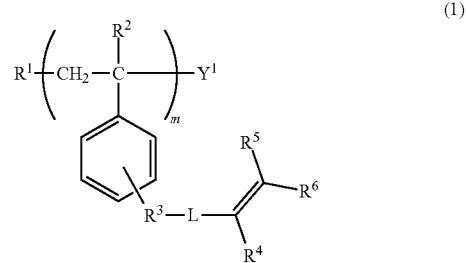

(1)

[Chem. 2]

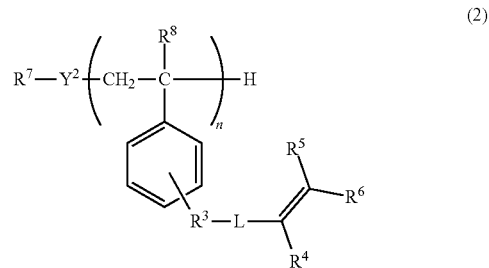

(2)

(In the general formulae (1) and (2), $R^1$ and $R^7$ each independently represent a polymerization initiator residue, $R^2$ and $R^8$ each independently represent an aromatic group or an alkyl group, $Y^1$ represents a polymer block of (meth) acrylic ester, $Y^2$ represents a polymer block of styrene or a derivative thereof, m and n each independently represent an integer from 1 to 5. In the general formulae (1) and (2), $R^3$ represents an alkylene group having 1 to 6 carbon atoms, L represents a linking group, $R^6$ represents a hydrogen atom, an alkyl group having 1 to 6 carbon atoms, or an aromatic group, and $R^5$ and $R^6$ each independently represent a hydrogen atom or an alkyl group having 1 to 6 carbon atoms.)

The present invention further provides a block copolymer represented by general formula (3) or (4).

[Chem. 3]

-continued

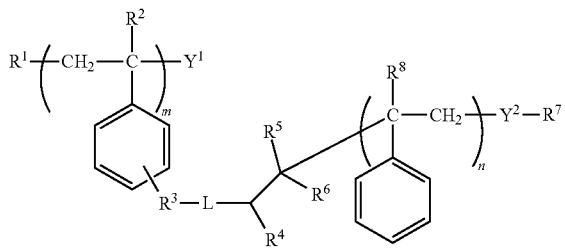
(3)

[Chem. 4]

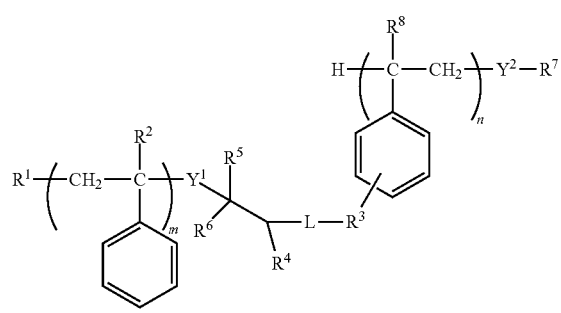
(4)

(In the general formulae (3) and (4), $R^1$ and $R^7$ each independently represent a polymerization initiator residue, $R^2$ and $R^8$ each independently represent an aromatic group or an alkyl group, $Y^1$ represents a polymer block of (meth)acrylic ester, $Y^2$ represents a polymer block of styrene or a derivative thereof, $R^3$ represents an alkylene group having 1 to 6 carbon atoms, L represents a linking group, m and n each independently represent an integer from 1 to 5, $R^6$ represents a hydrogen atom, an alkyl group having 1 to 6 carbon atoms, or an aromatic group, and $R^5$ and $R^6$ each independently represent a hydrogen atom or an alkyl group having 1 to 6 carbon atoms.)

Furthermore, the present invention provides a method for producing the block copolymer intermediate, the intermediate being represented by the general formula (1) or (2), and a method for producing the block copolymer represented by the general formula (3) or (4). The details of these production methods will be described in embodiments described below.

Advantageous Effects of Invention

The block copolymer intermediate according to the present invention is useful as a raw material for the block copolymer having a narrow molecular weight distribution and being applicable to the DSA technology. Furthermore, compared to a block copolymer obtained by the conventional initiation method, the block copolymer according to the present invention includes a first polymer block and a second polymer block each having a more precisely controlled molecular weight, and the block copolymer itself has a more precisely controlled molecular weight, so that the block copolymer has a narrower molecular weight distribution and is thereby applicable to the DSA technology. Furthermore, the method for producing the block copolymer according to the present invention is a method of separately synthesizing the first polymer block and the second polymer block and bonding the polymer blocks via a coupling reaction. The method is thus excellent with less difficulty in the synthesis and its capability of synthesizing the first and second polymer blocks to have the molecular weight and the molecular weight distribution as designed.

BRIEF DESCRIPTION OF DRAWINGS

FIG. 1 is a simplified diagram of a reaction procedure in Example 1.

DESCRIPTION OF EMBODIMENTS

A block copolymer intermediate according to the present invention is represented by general formula (1) or (2).

[Chem. 5]

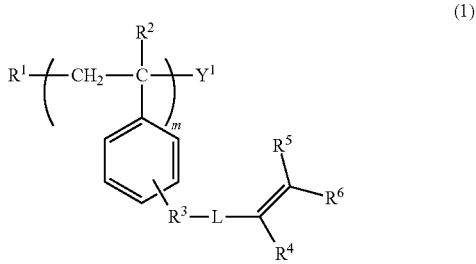
(1)

[Chem. 6]

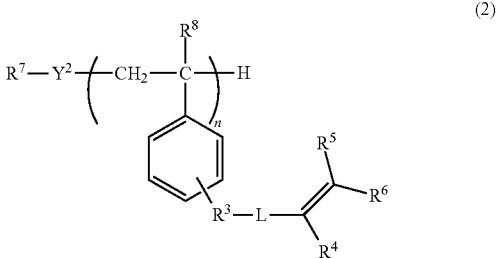
(2)

(In the general formulae (1) and (2), $R^1$ and $R^7$ each independently represent a polymerization initiator residue, $R^2$ and $R^6$ each independently represent an aromatic group or an alkyl group, $Y^1$ represents a polymer block of (meth)acrylic ester, $Y^2$ represents a polymer block of styrene or a derivative thereof, m and n each independently represent an integer from 1 to 5. Furthermore, in the general formulae (1) and (2), $R^3$ represents an alkylene group having 1 to 6 carbon atoms, L represents a linking group, $R^6$ represents a hydrogen atom, an alkyl group having 1 to 6 carbon atoms or an aromatic group, and $R^5$ and $R^6$ each independently represent a hydrogen atom or an alkyl group having 1 to 6 carbon atoms.)

In the general formulae (1) and (2), $R^1$ and $R^7$ each independently represent a polymerization initiator residue. Examples of the polymerization initiator include an organolithium polymerization initiator. Examples of the organolithium polymerization initiator include alkyllithiums, such as methyllithium, ethyllithium, propyllithium, butyllithiums (n-butyllithium, sec-butyllithium, iso-butyllithium, tert-butyllithium), pentyllithium, hexyllithium, methoxymethyllithium, and ethoxymethyllithium; phenylalkylenelithiums, such as benzyllithium, α-methylstyryllithium, 1,1-diphenyl-3-methylpentyllithium, 1,1-diphenylhexyllithium, and phenylethyllithium; alkenyllithiums, such as vinyllithium, allyllithium, propenyllithium, and butenyllithium; alkynyllithiums, such as ethynyllithium, butynyllithium, pentynyllithium, and hexynyllithium; aryllithiums, such as phenyllithium and naphthyllithium; heterocyclic lithiums, such as 2-thienyllithium, 4-pyridyllithium, and 2-quinolyllithium; and alkyl lithium-magnesium complexes, such as tri(n-butyl)magnesium lithium and trimethylmagnesium lithium. These polymerization initiators can be used alone or in combination of two or more.

In the above-mentioned organolithium polymerization initiator, the bond between an organic group and lithium is cleaved to form an active terminal in the organic group, and polymerization is initiated from the active terminal. Therefore, an obtained polymer terminal is bound to the organolithium-derived organic group. In the present invention, the organolithium-derived organic group bound to the polymer terminal is referred to as an organolithium polymerization initiator residue. For example, in a polymer obtained using methyllithium as a polymerization initiator, the organolithium polymerization initiator residue is a methyl group, while, in a polymer obtained using butyllithium as a polymerization initiator, the organolithium polymerization initiator residue is a butyl group.

In the general formula (1), $Y^1$ represents a polymer block of (meth)acrylic ester. Examples of the (meth)acrylic ester include alkyl (meth)acrylates, such as methyl (meth)acrylate, ethyl (meth)acrylate, n-butyl (meth)acrylate, sec-butyl (meth)acrylate, t-butyl (meth)acrylate, isopropyl (meth)acrylate, isobutyl (meth)acrylate, 2-ethylhexyl (meth)acrylate, decyl (meth)acrylate, undecyl (meth)acrylate, dodecyl (meth)acrylate (lauryl (meth)acrylate), tridecyl (meth)acrylate, pentadecyl (meth)acrylate, hexadecyl (meth)acrylate, heptadecyl (meth)acrylate, octadecyl (meth)acrylate (stearyl (meth)acrylate), nonadecyl (meth)acrylate, and icosanyl (meth)acrylate; aromatic (meth)acrylates, such as benzyl (meth)acrylate and phenylethyl (meth)acrylate; (meth)acrylates containing a cyclic compound, such as cyclohexyl (meth)acrylate and isobornyl (meth)acrylate; silane-based (meth)acrylates, such as trimethylsiloxy ethyl (meth)acrylate; (meth)acrylates having siloxy groups, such as a dialkylsiloxy group, a diphenylsiloxy group, a trialkylsiloxy group, and a triphenylsiloxy group; alkyl polyalkylene glycol mono(meth)acrylates, such as methoxy polyethylene glycol mono(meth)acrylate and methoxy polypropylene glycol mono(meth)acrylate; fluorinated (meth)acrylates, such as perfluoroalkylethyl (meth)acrylate; (meth)acrylate compounds, such as glycidyl (meth)acrylate, epoxy (meth)acrylate, ethylene glycol di(meth)acrylate, diethylene glycol di(meth)acrylate, trimethylolpropane tri(meth)acrylate, tetramethylene glycol tetra(meth)acrylate, 2-hydroxy-1,3-diacryloxypropane, 2,2-bis[4-(acryloxymethoxy)phenyl]propane, 2,2-bis[4-(acryloxyethoxy)phenyl]propane, dicyclopentenyl (meth)acrylate tricyclodecanyl (meth)acrylate, tris(acryloxyethyl)isocyanurate, and urethane (meth)acrylate; (meth)acrylates having an alkylamino group, such as dimethylaminoethyl (meth)acrylate, diethylaminoethyl (meth)acrylate, and dimethylaminopropyl (meth)acrylate.

Examples of the perfluoroalkylethyl (meth)acrylate include trifluoroethyl (meth)acrylate, 2-(perfluorobutyl)ethyl (meth)acrylate, 2-(perfluorohexyl)ethyl (meth)acrylate, and 2-(perfluorooctyl)ethyl (meth)acrylate.

In the present invention, "(meth)acrylic acid" refers to one or both of methacrylic acid and acrylic acid, and "(meth)acrylate" refers to one or both of methacrylate and acrylate.

In the general formulae (1) and (2), $R^2$ and $R^8$ each independently represent an aromatic group or an alkyl group. Examples of a compound serving as a raw material of a repeating unit represented with m or n in the general formulae (1) and (2) include 1,1-diphenylethylene and α-methylstyrene. In the case where the compound is 1,1-diphenylethylene, the above-mentioned $R^2$ and $R^8$ are each a phenyl group. In the case where the compound is α-methylstyrene, the above-mentioned $R^2$ and $R^8$ are each a methyl group.

In the general formula (2), $Y^2$ represents a polymer block of styrene or a derivative thereof. Examples of the derivative of styrene include p-dimethylsilylstyrene, (p-vinylphenyl)methylsulfide, p-hexynylstyrene, p-methoxystyrene, p-tert-butyldimethylsiloxystyrene, o-methylstyrene, p-methylstyrene, and p-tert-butylstyrene.

In the general formulae (1) and (2), L represents a linking group. Examples of the linking group include an ether bond, an ester bond, a urethane bond, an amide bond, a peptide bond, and a combination of two or more of these bonds. Among these bonds, an ether bond or an ester bond is preferable as the linking group. In the general formulae (1) and (2), $R^6$ represents a hydrogen atom, an alkyl group having 1 to 6 carbon atoms, or an aromatic group. $R^6$ is preferably a methyl group from the viewpoint of industrial availability of raw materials. $R^5$ and $R^6$ each independently represent a hydrogen atom or an alkyl group having 1 to 6 carbon atoms. $R^5$ and $R^6$ are each preferably a hydrogen atom for the purpose of avoiding steric hindrance in a reaction with an anion.

The block copolymer according to the present invention is represented by the general formula (3) or (4).

[Chem. 7]

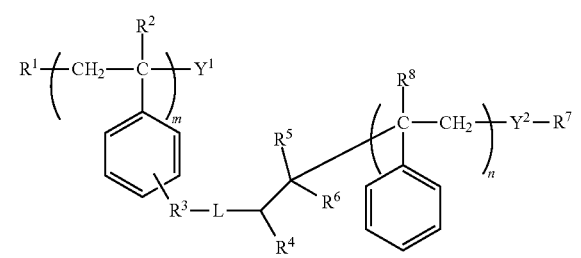

(3)

[Chem. 8]

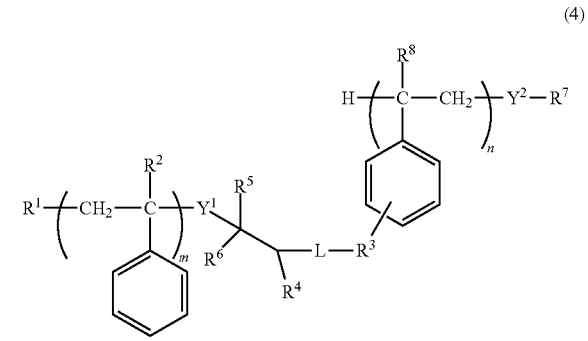

(4)

(In the general formulae (3) and (4), $R^1$ and $R^7$ each independently represent a polymerization initiator residue, $R^2$ and $R^8$ each independently represent an aromatic group or an alkyl group, $Y^1$ represents a polymer block of (meth)acrylic ester, $Y^2$ represents a polymer block of styrene or a derivative thereof, $R^3$ represents an alkylene group having 1 to 6 carbon atoms, L represents a linking group, m and n each independently represent an integer from 1 to 5, $R^4$ represents a hydrogen atom, an alkyl group having 1 to 6 carbon atoms, or an aromatic group, and $R^5$ and $R^6$ each independently represent a hydrogen atom or an alkyl group having 1 to 6 carbon atoms.)

The details of the signs in the general formulae (3) and (4) are as described above.

The weight-average molecular weight of each of a block including $Y^1$ and a block including $Y^2$, the blocks being positioned respectively at both terminals of —$R^3$— in the general formulae (3) and (4), is preferably in the range of 1,000 to 1,000,000, more preferably in the range of 3,000 to 500,000, and still more preferably in the range of 5,000 to 100,000. The degree of dispersion of each of the blocks is preferably in the range of 1.01 to 2, more preferably in the range of 1.01 to 1.5, and still more preferably in the range of 1.01 to 1.05.

As a method for producing the block copolymer intermediate represented by the general formula (1) above, for example, there can be mentioned a method which comprises, using a microreactor having a channel capable of mixing a plurality of liquids, reacting a polymerization initiator and diphenylethylene having a silyl ether alkyl group, and then introducing a (meth)acrylic acid ester to the resultant reaction product to cause living anionic polymerization, obtaining a polymer block of (a) an (meth)acrylic acid ester, and then displacing the silyl ether group of the diphenylethylene by -$LR^4C$=$CR^5R^6$.

Further, as a method for producing the block copolymer intermediate represented by the general formula (2) above, for example, there can be mentioned a method which comprises, using a microreactor having a channel capable of mixing a plurality of liquids, subjecting styrene or a derivative thereof to living anionic polymerization in the presence of a polymerization initiator, and then reacting the resultant product with diphenylethylene having a silyl ether alkyl group to obtain a polymer block of styrene or derivative thereof, and then displacing the silyl ether group of the diphenylethylene by -$LR^4C$=$R^5R^6$.

On the other hand, as a method for producing the block copolymer represented by the general formula (3) above, for example, there can be mentioned a method using the block copolymer intermediate represented by the general formula (1) above. This method is a method which comprises, using a microreactor having a channel capable of mixing a plurality of liquids or a batch reactor, subjecting styrene or a derivative thereof to living anionic polymerization in the presence of an alkyllithium, and then reacting the resultant product with diphenylethylene to obtain a polymer (S), and bonding the polymer (S) and the block copolymer intermediate represented by the general formula (1), which is obtained by the above-mentioned method, by a displacement reaction of an anionic end of the polymer (S) by -$LR^4C$ $R^5R^6$ of the block copolymer intermediate.

Further, as a method for producing the block copolymer represented by the general formula (4) above, for example, there can be mentioned a method using the block copolymer intermediate represented by the general formula (2) above. This method is a method which comprises, using a microreactor having a channel capable of mixing a plurality of liquids or a batch reactor, reacting an alkyllithium and diphenylethylene, and then introducing a (meth)acrylic acid ester to the resultant reaction product to cause living anionic polymerization, obtaining a polymer (A), and bonding the polymer (A) and the block copolymer intermediate represented by the general formula (2), which is obtained by the above-mentioned method, by a displacement reaction of an anionic end of the polymer (A) by -$LR^4C$=$CR^5R^6$ of the block copolymer intermediate.

The silyl ether alkyl group of 1,1-diphenylethylene or the like to be used as a raw material for the block copolymer intermediate, the intermediate being represented by the general formula (1) or (2), is beneficially a group commonly used as a protective group for alcohols. Examples of the silyl ether alkyl group include a group represented by the general formula (5).

[Chem. 9]

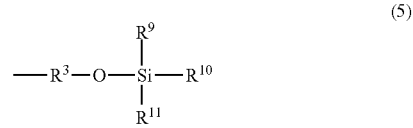

(5)

(In the general formula (5), $R^9$, $R^{10}$, and $R^{11}$ each independently represent an alkyl group having 1 to 4 carbon atoms or a phenyl group, and $R^3$ represents an alkylene group having 1 to 6 carbon atoms.)

Examples of the silyl ether group in the general formula (5) (a site excluding —$R_3$—) include a trimethylsilyl group, a triethylsilyl group, a tert-butyldimethylsilyl group, a triisopropylsilyl group, and a tert-butyldiphenylsilyl group. Among these silyl ether groups, a tert-butyldimethylsilyl group is preferable in terms of an excellent balance between the stability of a precursor of an obtained block copolymer intermediate (a block copolymer intermediate before substituted with a group represented by —$R^3$-$LR^4C$=$CR^5R^6$) and the reactivity of the subsequent substitution of a group represented by —$R^3$-$LR^4C$=$CR^5R^6$.

The silyl ether alkyl group is bound at the same position as the position of —$R^3$-$LR^4C$=$CR^5R^6$ in the general formulae (1) and (2). Note that —$R^3$-$LR^4C$=$CR^5R^6$ in the general formulae (1) and (2) is obtained by replacing a silyl ether group with a group represented by -$LR^4C$=$R^5R^6$. Here, the silyl ether alkyl group is bound to a benzene ring, and a position of the bond may be an ortho, meta, or para position based on a bond position of a carbon atom (a carbon atom to which $R^2$ or $R^8$ is bound) bound to the benzene ring in the general formulae (1) and (2). The silyl ether alkyl group is preferably bound to the meta position because bond formation (coupling reaction) can be smoothly made in the production of the block copolymer.

Examples of a method for replacing the silyl ether group with a group represented by -$LR^4C$=$CR^5R^6$ include a method in which, first, the silyl ether group is deprotected to make a terminal thereof into a hydroxyl group, and the hydroxyl group is allowed to react with a compound represented by the following general formula (6), such as a methacrylic acid, to esterify the terminal. Examples of a reaction to esterify the terminal hydroxyl group include the Mitsunobu reaction in which substitution is performed using a compound represented by the general formula (6) such as a methacrylic acid serving as a nucleophile in the presence of diisopropyl azodicarboxylate (DIAD) and triphenylphosphine.

[Chem. 10]

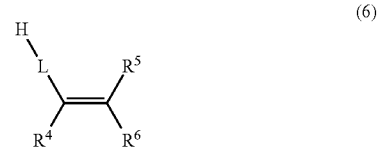

(6)

(Signs in general formula (6) are the same as those described above.)

To completely substitute the silyl ether group with a group represented by $-LR^4C=CR^5R^6$, a compound represented by the general formula (6) is preferably used in excessive amounts with respect to the silyl ether group. When the molecular weight of the precursor of the block copolymer intermediate is relatively large, the compound represented by the general formula (6) is preferably used in further excessive amounts. Although depending on the molecular weight of the precursor of the block copolymer intermediate, the excessive amounts of the compound represented by the general formula (6) is preferably 50 to 200 equivalents, and more preferably 50 to 100 equivalents with respect to the hydroxyl group.

A solvent to be used in the reaction in which the silyl ether group is deprotected to make a terminal thereof into a hydroxyl group and substitute the silyl ether group with a group represented by $-LR^4C=CR^5R^6$ is beneficially a solvent having polymer solubility. Examples of the solvent include tetrahydrofuran, dimethyl sulfoxide, N,N-dimethylformamide, acetone, and acetonitrile.

A reaction temperature in the reaction in which the silyl ether group is deprotected to make a terminal thereof into a hydroxyl group and substitute the silyl ether group with a group represented by $-LR^4C=CR^5R^6$ is preferably around room temperature, for example, in a range of 20° C. to 40° C. because such temperature makes it possible to accelerate a reaction rate, substantially prevent the elimination of the substituted group represented by $-LR^4C=CR^5R^6$ and a side reaction of the precursor of the block copolymer intermediate and the compound represented by the general formula (6), and achieve excellent energy efficiency.

In the above-mentioned method, when raw materials, such as a monomer and a polymerization initiator, are introduced into the microreactor, it is preferred that each raw material is introduced in the form of a solution obtained by diluting or dissolving the raw material using an organic solvent.

Examples of the organic solvents include hydrocarbon solvents, such as pentane, hexane, octane, cyclohexane, benzene, toluene, xylene, decalin, tetralin, and derivatives thereof; and ether solvents, such as diethyl ether, tetrahydrofuran (THE), 1,4-dioxane, 1,2-dimethoxyethane, diethylene glycol dimethyl ether, and diglyme. These organic solvents can be used individually or in combination.

When a monomer is diluted with an organic solvent, a good balance between an efficient increase of the amount of the polymer produced per unit time and suppression of clogging of the channel due to gel formation in the microreactor is needed, and therefore the concentration of each constituent monomer in the monomer solution is preferably 0.1 M (mol/L, this applies to the followings) or more, more preferably in the range of from 0.1 to 3 M, further preferably in the range of from 0.2 to 2 M.

From the viewpoint of achieving an efficient increase of the amount of the polymer produced per unit time, the concentration of the polymerization initiator in the organic solvent solution is preferably 0.01 M or more, more preferably in the range of from 0.01 to 3 M, further preferably in the range of from 0.01 to 2 M. Further, with respect to the organic solvent used for diluting or dissolving the polymerization initiator to form a solution, taking into consideration the dissolving power for the organolithium polymerization initiator and the stability of the activity of the initiator, a hydrocarbon solvent, such as hexane, cyclohexane, benzene, toluene, or xylene, is preferred.

When the solutions of a monomer and a polymerization initiator at a high concentration are introduced into the channel of the microreactor, in order to cause living anionic polymerization to smoothly proceed, it is necessary that the high viscosity solution of the polymerization product of monomer formed by polymerization be surely fed into the channel of the microreactor. Particularly, in living anionic polymerization of the intermediate polymer obtained in each step and a monomer, it is necessary that the high-viscosity intermediate polymer solution and the low-viscosity monomer solution be surely mixed with each other, despite a large difference in the viscosity, to cause living anionic polymerization, making it possible to surely feed the high-viscosity solution of the formed block copolymer. As a pump for surely introducing such a high viscosity solution into the channel of the microreactor, preferred is a pump which enables high pressure feeding and has a pulsating flow markedly reduced, and, as such a pump, a plunger pump or a diaphragm pump is preferred.

Further, with respect to the feeding pressure upon introducing the solutions of a monomer, a polymerization initiator, and a coupling agent into the channel of the microreactor, in view of enabling efficient production of the polymer, the feeding pressure is preferably in the range of from 0.1 to 32 MPa, more preferably in the range of from 0.5 to 20 MPa, further preferably in the range of from 1 to 15 MPa. As a pump capable of feeding a solution at such a pressure, a plunger pump for liquid chromatography is preferred, and a double plunger pump is more preferred. Further preferred is a method of feeding a solution using a double plunger pump which has a damper attached to the outlet thereof so as to suppress a pulsating flow.

The microreactor used in the invention is a microreactor having a channel capable of mixing a plurality of liquids, preferably a microreactor having a heat-transfer reaction vessel having a channel formed, more preferably a microreactor having a heat-transfer reaction vessel having formed therein a microtubular channel, especially preferably a microreactor having a heat-transfer reaction vessel having heat-transfer plate structures, each having a plurality of groove portions formed in the surface thereof, which are stacked on one another.

The living anionic polymerization reaction in the invention can be conducted at a temperature of −78° C. or lower, which is the reaction temperature used in a conventional batch-wise manner reaction, but can be conducted at a temperature of −40° C. or higher, which is the temperature that is industrially practical, and can be conducted at −28° C. or higher, and, for suppressing gel formation in the microreactor, the reaction temperature is especially preferably −15° C. or higher. When the reaction temperature is −40° C. or higher, the polymer can be produced using a cooling apparatus having a simple construction, so that the production cost can be advantageously reduced. Further, when the temperature is −28° C. or higher, the polymer can be produced using a cooling apparatus having a simpler construction, so that the production cost can be advantageously considerably reduced.

In the invention, a preferred mode of the micromixer system for mixing the solutions of a monomer and the like is preferably a micromixer capable of mixing a monomer solution and a polymerization initiator solution at a high concentration in a short time for introducing the solutions at a high concentration, as compared to that in a conventional method, into the channel of the microreactor to cause living anionic polymerization to smoothly proceed.

The micromixer is the channel of the microreactor, which is capable of mixing a plurality of liquids, and, with respect to the micromixer, a commercially available micromixer can be used, and examples include a microreactor having an interdigital channel structure, Single mixer and Caterpillar mixer, manufactured by InstitutfürMikrotechnikMainz (IMM); Micro glass reactor, manufactured by Micro Glass Co., Ltd.; Cytos, manufactured by CPC Systems, Inc.; YM-1, YM-2 type mixer, manufactured by Yamatake Co., Ltd.; Mixing T and T (T-connector), manufactured by Shimadzu GLC Ltd.; IMT chip reactor, manufactured by Institute of Microchemical Technology Co., Ltd.; and Micro Hi-Mixer, which is a product developed by Toray Engineering Co., Ltd., and any of these micromixers can be used in the invention.

The micromixer system is preferably a micromixer in which a channel space that is relatively large, as compared to the liquid introduction channel for the micromixer, is formed in the mixing portion. By using such a micromixer system, it is possible to efficiently mix a low-viscosity solution and a high-viscosity solution.

The micromixer in which a channel space that is relatively large, as compared to the liquid introduction channel for the micromixer, is formed in the mixing portion may be a metal integral micromixer, and may be a combination of a micromixer in which process plates having a channel through which two types of solutions pass are stacked on one another and the two types of solutions are mixed at the outlet of the channel, and a micromixer having a channel through which the mixed solution passes.

Further, the channel internal diameter of the inlet portion of the micromixer varies depending on the linear speed of the reaction mixture, but is preferably in the range of from 0.1 to 2.0 mm, more preferably in the range of from 0.2 to 1.5 mm. Further, the channel internal diameter of the inlet portion of the micromixer is preferably in the range of from 1 to 5 times the channel internal diameter of the inlet portion, and is more preferably in the range of from 1.5 to 3 times because the amount of the polymer produced per unit time can be further increased, and the mixing efficiency can be improved.

With respect to the reaction apparatus used in the method of the invention, preferred is a reaction apparatus having a heat-transfer reaction vessel having a channel formed, and the channel is preferably a channel which is microtubular because it is possible to quickly control heating. With respect to the microtubular channel, preferred is a channel having such a void size that the channel cross-sectional area is 0.1 to 4.0 mm$^2$, in view of controlling the polymerization reaction temperature. In the invention, the term "cross-sectional" means a cross-section taken along the direction perpendicular to the flow direction in the channel, and the term "cross-sectional area" means an area of the cross-section.

The cross-sectional form of the channel may be a rectangular form including square and rectangle, a polygonal form including trapezoid, parallelogram, triangle, pentagon, and the like (including these forms having the corners rounded, and a form having a high aspect ratio, i.e., a slit form), a star form, a circular form including semicircle and ellipse, or the like. The cross-sectional form of the channel need not be consistent.

With respect to the method for forming the reaction channel, there is no particular limitation, but, generally, a member (I) having a plurality of grooves in the surface thereof and another member (II) are fixed by stacking or bonding the member (II) onto the surface of the member (I) having the grooves, forming a channel as a space between the member (I) and the member (II).

The channel may be further provided with a heat exchange function. In this case, for example, a member (X) having formed in the surface thereof grooves for flowing a temperature control fluid and another member may be fixed by a method, e.g., bonding or stacking the another member onto the surface having formed the grooves for flowing a temperature control fluid. Generally, a member (I) having grooves in the surface thereof and a member (II) having formed grooves for flowing a temperature control fluid may be fixed so that the surface having formed the grooves is fixed to the surface on the other side of the surface of another member having formed the grooves, forming a channel, and a plurality of the members (I) and members (II) may be alternately fixed to one another.

In this case, the grooves formed in the surface of the member may be formed as so-called grooves which are lower than the surroundings, and may be formed as spaces between walls present on the surface of the member. The method for forming grooves in the surface of the member is arbitrary, and, for example, a method, such as injection molding, a solvent casting method, a melt replica method, cutting, etching, photolithography (including energy ray lithography), or laser ablation, can be used.

The layout of the channel in the member may be a linear, branched, comb-like, curved, spiral winding, or zigzag configuration or other arbitrary configurations according to the use or purpose.

The channel may be additionally connected to, for example, a mixing field, an extraction field, a separation field, a flow rate measuring part, a detector, a storage vessel, a membrane separation mechanism, a connection port into or out of the device, a circuit, a development channel for chromatography or electrophoresis, a part of a valve structure (surrounding part of a valve), a pressurizing mechanism, an evacuating mechanism, or the like.

With respect to the external shape of the member, there is no particular limitation, and a form according to the use or purpose can be employed. The form of the member may be, for example, a plate form, a sheet form (including a film form, a ribbon form, and the like), a coating film form, a rod form, a tube form, or other complicated shape of a molded article. An external size, such as a thickness, is preferably consistent. The material for the member is arbitrary, and may be, for example, a polymer, glass, ceramic, a metal, or a semiconductor.

As mentioned above, the reaction apparatus used in the method of the invention is preferably a reaction apparatus having a heat-transfer reaction vessel having a channel formed, and may be a tube immersed in an oil bath, a water bath, or the like. Further, as the reaction apparatus having a heat-transfer reaction vessel having a channel formed, there can be used a reaction apparatus having a structure in which heat-transfer plate structures, each having a plurality of groove portions formed in the surface thereof, are stacked on one another.

As such a reaction apparatus, there can be mentioned, for example, an apparatus having the above-mentioned channel (hereinafter, referred to simply as "microchannel") formed in a member used as a device for chemical reaction.

In the synthesis of the block copolymer represented by the general formula (3) above, the polymer (S) having an anionic end may be synthesized using either the above-described microreactor or a batch reactor.

Further, in the synthesis of the block copolymer represented by the general formula (4) above, the polymer (A)

having an anionic end may be synthesized using either the above-described microreactor or a batch reactor.

With respect to the batch reactor, a known batch reactor can be used.

In the synthesis of the block copolymer represented by the general formula (3) or (4) above, for removing water contained in a very small amount in the solution of the block copolymer intermediate represented by the general formula (1) or (2) above, it is preferred that diethylzinc is added. The amount of the diethylzinc added is preferably in the range of from 0.1 to 5 parts by mass, relative to 100 parts by mass of the solution of the block copolymer intermediate.

The ratio of the reaction of the polymer (S) or polymer (A) having an anionic end and the block copolymer intermediate represented by the general formula (1) or (2) above is preferably in the range of from 1 to 10/1 (molar ratio). Further, from the viewpoint of achieving a further improvement of the yield and facilitating the below-mentioned purification step, the ratio of the reaction is more preferably in the range of from 1 to 5/1 (molar ratio). When the anionic end is present in an excess amount, the reaction solution has a red color.

Further, in the reaction of the polymer (S) or polymer (A) having an anionic end and the block copolymer intermediate represented by the general formula (1) or (2) above, from the viewpoint of achieving suppression of a side reaction and preventing deactivation of the anionic end, the reaction temperature is preferably in the range of from −60 to −100° C., more preferably in the range of from −70 to −80° C.

In the synthesis of the block copolymer represented by the general formula (3) above, purification of the block copolymer is made by removing the polymer (S) used in an excess amount. As a method for the purification, a reprecipitation method is preferred. As an operation for reprecipitation method, for example, there can be mentioned a method in which a solution obtained by dissolving a crude product of the block copolymer in a small amount of a good solvent is slowly added to a large amount of a poor solvent, or a large amount of a poor solvent is added to a solution obtained by dissolving a crude product of the block copolymer in a good solvent to obtain a product in the form of precipitate, and the precipitate is separated and recovered by filtration, obtaining a purified block copolymer.

With respect to the good solvent used in the purification of the block copolymer represented by the general formula (3) above, preferred is tetrahydrofuran, toluene, or the like. Further, with respect to the poor solvent, preferred is cyclohexane which is a good solvent for polystyrene. In the block copolymer of the general formula (3) wherein $Y^2$ is a polymer block of styrene, and $Y^1$ is a polymer block of methyl methacrylate, when the mass ratio of $Y^2$ to $Y^1$ [$Y^2/Y^1$] is in the range of from 50/50 to 99/1, that is, the mass ratio of the styrene polymer block is high, the block copolymer itself is dissolved in cyclohexane which is a poor solvent, and therefore, for the purpose of reducing dissolution of the block copolymer in cyclohexane and removing only the insoluble polymer (S) to obtain a high-purity block copolymer, it is preferred that a certain amount of a hydrocarbon solvent, such as hexane or heptane, is added to cyclohexane.

In the synthesis of the block copolymer represented by the general formula (4) above, purification of the block copolymer is made by removing the polymer (A) used in an excess amount. As a method for the purification, a reprecipitation method is preferred like the purification of the block copolymer represented by the general formula (3) above. For example, with respect to the block copolymer of the general formula (4) wherein $Y^1$ is a polymer block of methyl methacrylate, and $Y^2$ is a polymer block of styrene, for removing the polymer (A) from the block copolymer, it is preferred that tetrahydrofuran, toluene, or the like, which has high dissolving power for the block copolymer, is used as a good solvent, and acetonitrile, which has high dissolving power for polymethyl methacrylate and low dissolving power for the block copolymer, is used as a poor solvent.

EXAMPLES

Hereinafter, the present invention will be described in more detail by means of Examples. Note that the present invention is not limited in any way by Examples.

Micromixer Used in the Examples

The microreactor used in the present Examples has a micromixer composed of a T shaped junction, and a tube reactor connected downstream of the micromixer. With respect to the micromixer, a custom-made micromixer by Sanko Seiki Kogyo Co., Ltd. was used (a micromixer equivalent to that in the present Examples is available by requesting the production based on the description of the present Examples). The micromixer used in the present Examples has therein a first introduction channel, a second introduction channel, and part of the channel where these introduction channels meet, and, in the micromixer, all the channels have the same internal diameter. Therefore, hereinafter, the internal diameter of these channels is collectively referred to as "the internal diameter of the micromixer".

The number average molecular weight and the weight-average molecular weight of polymers produced in Examples and Comparative Examples were determined as follows.

[Method for Determining Number Average Molecular Weight and Weight-Average Molecular Weight]

The number average molecular weight (Mn) and the weight-average molecular weight (Mw) of the polymers were determined by gel permeation chromatography (GPC).
    Measurement Device: high-speed GPC system (HLC-8220GPC, manufactured by Tosoh Corporation)
    Column: The following columns manufactured by Tosoh Corporation were connected in series and used.
    TSKgel SuperHZM-M (15 cm)×3
    Detector: RI (differential refractometer)
    Column temperature: 40° C.
    Eluent: tetrahydrofuran (THF)
    Flow Rate: 0.5 mL/min
    Injection Amount: 20 μL (a tetrahydrofuran solution having a sample concentration of 1.0% by mass)
    Standard Samples: The following types of standard polystyrene were used to produce a calibration curve.
(Standard Polystyrene)
    "TSKgel Standard Polystyrene Kit PStQuick B", manufactured by Tosoh Corporation
    "TSKgel Standard Polystyrene Kit PStQuick C", manufactured by Tosoh Corporation
    "TSKgel Standard Polystyrene Kit PStQuick D", manufactured by Tosoh Corporation

[Method for Determining the Amount of Residual Monomer]

The amount of residual monomers in a polymer was determined by gas chromatography (GC).
    Measurement Device: GC system ("GC-2014", manufactured by SHIMADZU CORPORATION)

Column: "DB-WAX" (0.53 mm×30 m), manufactured by Agilent Technologies, Inc.×1

Vaporizing Chamber Temperature: 160° C.

Column Temperature: 40° C., to 230° C., Temperature Increase

Rate: 10° C./min

Detector: FID, Detector Operating Temperature: 300° C.

Carrier Gas: He, Flow Rate: 20.0 mL/min

Sample Injection Amount: 1.0 µL (a tetrahydrofuran solution having a sample concentration of 0.4% by mass)

[Identification of Diphenylethylene Having a Silyl Ether Alkyl Group, and Method for Measuring a Functional Group Displacement Ratio of a Block Copolymer Intermediate]

Identification of diphenylethylene having a silyl ether alkyl group and measurement of a functional group conversion ratio from a silyl ether group to a methacryl group in the block copolymer intermediate were performed by $^1$H-NMR.

Measurement Device: NMR system ("JMTC-400/54", manufactured by Japan Superconductor Technology, Inc.)

Solvent: CDCl$_3$ (reference substance)

Measurement Mode: $^1$H-NMR

Cumulative total of the number of times: 64 (identification of diphenylethylene), 3,000 (functional group conversion ratio of the block copolymer intermediate)

[Method for Determining Purity of Diphenylethylene Having Silyl Ether Alkyl Group]

The purity of diphenylethylene having a silyl ether alkyl group was determined by high performance liquid chromatography (HPLC).

Measurement Device: HPLC system ("LC-10A", manufactured by SHIMADZU CORPORATION)

Column: "Mightysil RP-18GP" (filler particle size: 5 µm), manufactured by KANTO CHEMICAL CO., INC.

Developing Solvent: water/acetonitrile

Gradient: acetonitrile volume percent 50% to 100% by volume (10 min)

Flow Rate: 1.0 mL/min

Detector: UV (254 nm)

(Synthesis Example 1: Synthesis of 1-(3-tert-butyldimethylsilyloxymethylphenyl)-1-phenylethylene)

A 5-L four-neck flask equipped with a stirrer, a dropping funnel, and a reflux condenser was sufficiently dried, and purged with argon gas. Into the flask, 480 g (2.6 mol) of 3-bromobenzaldehyde, 251 g (4.0 mol) of ethylene glycol, 1910 mL of toluene, and 2.29 g (0.012 mol) of p-toluenesulfonic acid monohydrate were fed, and refluxed at an internal temperature of 115° C. After the reaction, 500 mL of toluene and 500 mL of water were added to perform liquid separation, and the resulting organic layer was washed four times with 1,000 mL of water. Subsequently, 48 g of magnesium sulfate was added, and the mixture was dried for 30 minutes, and then the solvent was removed by evaporation to obtain an intermediate (1). The obtained intermediate (1) was 592 g in weight, and the yield thereof was 99.6%.

A 3-L four-neck flask equipped with a stirrer, a dropping funnel, and a reflux condenser was sufficiently dried, and purged with argon gas. Into the flask, 22.0 g (0.90 mol) of magnesium shavings were fed, and stirred for 30 minutes. 1,2-bromoethane (200 µL) dissolved in 70 mL of tetrahydrofuran (hereinafter, abbreviated as "THF") was added dropwise to activate the magnesium, and then, with keeping the temperature at 10° C. or lower, 1,190 mL of a THF solution containing 160.1 g of the intermediate (1) obtained above was added dropwise to a magnesium suspension over 3 hours. Subsequently, the resulting solution was stirred at 5° C. overnight, and then, with keeping the temperature at 5° C. or lower, a mixture of 80.3 g acetophenone and 60.8 mL of THF was added dropwise to the resulting reaction solution over 2 hours. Subsequently, the resulting solution was stirred at 5° C. or lower for 30 minutes, followed by stirring at 25° C. for 6 hours. Furthermore, 1,585 mL of a 2N hydrochloric acid solution was added dropwise to the reaction solution over 3 hours, and then liquid separation was performed to extract an aqueous layer with 1,000 mL of diethyl ether three times. Subsequently, the resultant was dried with sodium sulfate overnight, and the solvent was removed by evaporation to obtain 191.8 g of a brown oily component. The brown oily component was purified by a silica gel column to obtain an intermediate (2). The obtained intermediate (2) was 70.3 g in weight, and the yield thereof was 44.5%.

A 1-L four-neck flask equipped with a stirrer, a dropping funnel, and a reflux condenser was sufficiently dried, and purged with argon gas. Into the flask, 70.3 g (0.31 mol) of the intermediate (2) obtained above, 343 mL of toluene, and 0.54 g (0.0029 mol) of p-toluenesulfonic acid monohydrate were fed, and refluxed at 100° C. for 3 hours. Subsequently, 5 mL of a 1N sodium hydrogen carbonate solution was added, and the resulting reaction solution was washed three times with 200 mL of water. Subsequently, after the solution was dried with magnesium sulfate for 30 minutes, the solvent was removed by evaporation to obtain 66.2 g of an orange oily component. The orange oily component was purified by a silica gel column to obtain an intermediate (3). The obtained intermediate (3) was 52.5 g in weight, and the yield thereof was 81.0%.

A 1-L four-neck flask equipped with a stirrer, a dropping funnel, and a reflux condenser was sufficiently dried, and purged with argon gas. Into the flask, 52.5 g (0.25 mol) of the intermediate (3) obtained above and 461 mL of ethanol were fed and stirred. Subsequently, with keeping the temperature at 5° C. or lower, 14.5 g (0.38 mol) of sodium borohydride was added to the resulting reaction solution over 1 hour. Subsequently, with keeping the temperature at 5° C. or lower, the solution was stirred for 30 minutes, followed by stirring at 25° C. for 1 hour. Subsequently, with keeping the temperature at 5° C. or lower, 190 mL of a 2N hydrochloric acid solution was added, and then ethanol was removed by evaporation, and 100 mL of diethyl ether was added to perform liquid separation. Subsequently, an aqueous layer was extracted three times with 250 mL of diethyl ether, and then the resultant was dried overnight with sodium sulfate, and the solvent was removed by evaporation to obtain 60.7 g of a yellow oily component. The yellow oily component was purified by a silica gel column to obtain an intermediate (4). The obtained intermediate (4) was 45.1 g in weight, and the yield thereof was 88.6%.

A 2-L four-neck flask equipped with a stirrer, a dropping funnel, and a reflux condenser was sufficiently dried, and purged with argon gas. Into the flask, 85.0 g (0.40 mol) of the intermediate (4) obtained above, 82.6 g (1.2 mol) of imidazole, and 632 mL of dry dimethylformamide (hereinafter, abbreviated as "DMF") were added and stirred for 30 minutes. Subsequently, with keeping the temperature 5° C. or lower, 67.0 g of tert-butyldimethylsilyl chloride and 252 mL of dry DMF were added dropwise to the resulting reaction solution over 1 hour. Subsequently, with keeping the temperature at 5° C. or lower, the solution was stirred for 15 minutes, followed by stirring at 25° C. for 1 hour. Subsequently, with keeping the temperature 5° C. or lower, 150 mL of a saturated sodium carbonate solution was added, and then 1,000 mL of hexane was added to perform liquid separation. Subsequently, an aqueous layer was extracted five times with 1,000 mL of hexane, and then the resultant was dried overnight with sodium sulfate and the solvent was removed by evaporation, and remaining components were purified by a silica gel column treated with 1% by mass of triethylamine, whereby a yellow oily component was obtained. The obtained yellow oily component was 125 g in weight, and the yield thereof was 95.3%.

When the yellow oily component obtained above was subjected to compound identification by $^1$H-NMR measurement, the following chemical shift was observed to confirm that the yellow oily component was targeted 1-(3-tert-butyldimethylsilyloxymethylphenyl)-1-phenylethylene (hereinafter, abbreviated as "DPE-Si"). The HPLC purity of the DPE-Si was 99.5%.

σ=0.10 (s, 6H, CH$_3$—Si—), 0.90 (s, 9H, (CH$_3$)$_3$C—Si—), 4.76 (s, 2H, Ar—CH$_2$—), 5.47, 5.49 (ss, 2H, CH$_2$—), 7.29-7.37 (m, 9H, Ar—)]

Example 1: Synthesis of a Block Copolymer Intermediate

First, the following four types of solutions were prepared.
(1) MMA (1.5 M) Solution In a 1-L medium bottle purged with argon gas, 172.0 g (182.9 mL) of MMA, 845.3 g of THF, and 11.5 ml of a hexane solution of 1 M diethyl zinc were sampled using a syringe and stirred to prepare 1145 mL of a solution of 1.5 M MMA and 0.011 M diethyl zinc.
(2) Silyl Ether-Substituted Diphenylethylene (0.01 M) Solution In a 2-L medium bottle purged with argon gas, 3.20 g (3.40 mL) of silyl ether-substituted diphenylethylene (hereinafter, referred to as "DPE-Si") and 100.0 mL of a THF solution of 0.5 M LiCl and 797.3 g of THF were sampled using a syringe and stirred to prepare 1000 mL of a solution of 0.01 M DPE-Si and 0.05 M LiCl.
(3) n-Butyllithium (0.020 M) Solution In a 500-mL medium bottle purged with argon gas, 343 g of toluene and 5.0 mL of a solution of 1.57 M n-butyllithium (hereinafter, referred to as "n-BuLi") were sampled using a syringe and stirred to prepare 400 mL of a 0.02 M n-BuLi solution.
(4) Methanol (1.5 M) Solution In a 100-mL round-bottom flask purged with argon gas, 2.48 g of methanol and 46.9 mL of THF were sampled using a syringe and stirred to prepare a 50-mL methanol solution having a concentration of 1.5 M.

A microreactor apparatus having a micromixer composed of three T-joints and a tube reactor connected downstream of the micromixer, four plunger pumps ("PU714" and "PU716", manufactured by GL Science Inc.), and the respective medium bottles for the prepared n-BuLi solution, DPE-Si solution, and MMA solution were connected, and set so that the respective solutions were fed using the four plunger pumps to the microreactor apparatus. From the upstream side of a reactor having a micromixer having a pipe joint diameter of 250 μm and (internal diameter: 0.5 mm, length: 100 cm)+(internal diameter: 2.17 mm, length: 400 cm) tube reactors, the n-BuLi solution was fed at a rate of 2.0 mL/minute and the DPE-Si solution was fed at a rate of 7.8 mL/minute and the solutions were mixed to perform a reaction of n-BuLi and DPE-Si. Subsequently, from the upstream side of a reactor having a micromixer having a pipe joint diameter of 250 μm and (internal diameter: 0.5 mm, length: 50 cm)+(internal diameter: 1 mm, length: 300 cm)+(internal diameter: 2.17 mm, length: 400 cm) tube reactors, the obtained DPE-Si reaction solution and the MMA solution were fed at a rate of 10.3 mL/minute and mixed to perform polymerization of the DPE reaction solution and MMA. Finally, from the upstream side of a reactor having a micromixer having a pipe joint diameter of 250 μm and (internal diameter: 0.5 mm, length: 50 cm)+(internal diameter: 2.17 mm, length: 9200 cm) tube reactors, the obtained MIA polymerization solution was sampled into a methanol-solution-containing sample bottle to stop the reaction, whereby PMMA-(Bn)Si was obtained. The reaction was performed by immersion in a thermostat at −70° C.

The reaction solution obtained above was fed into a methanol solution to stop the reaction, whereby a precursor solution of a block copolymer intermediate was obtained. Note that FIG. 1 is a simplified diagram of the reaction procedure in Example 1.

Based on the amount of monomers remaining in the solution of the obtained polymer PMMA-(Bn)Si, the reaction rate of MMA (polymer conversion rate) was determined to be 100%. The number average molecular weight (Mn) of the obtained polymer was 38,600 and the degree of dispersion (Mw/Mn) thereof was 1.13.

100 mL of the precursor solution of the block copolymer intermediate obtained above was added dropwise to 400 mL of heptane, and DPE-Si was removed by reprecipitation purification. After filtration and drying, the resultant was dissolved in 30 mL of toluene, and a metal salt was removed therefrom by diatomaceous earth filtration. Subsequently, a toluene solution was added dropwise to 400 mL of heptane, and the resulting mixture was subjected to reprecipitation, followed by vacuum drying.

The inner wall of the flask was cleaned using a THF solution of DPE anion (it was confirmed that red coloration disappeared), and then 40 mL of dry THF was added to 6.0 g of PMMA-(Bn)Si synthesized using the DPE derivative synthesized in Example (1), and dissolved therein. 1.33 mL (10 equivalents to the terminal) of a THE solution of 1.0 M tetra-n-butylammonium fluoride (TBAF) was added, and then the mixture was allowed to react at 30° C. for 24 hours. Subsequently, 200 mL of methanol was added to quench the reaction.

Approximately 2.0 g of the concentrated sample was reprecipitated twice in 300 mL of methanol. The precipitate was collected and reprecipitated in 300 mL of heptane. A residual solvent and other components were removed by vacuum drying.

Measurement: A product resulting from the filtration was vacuum-dried and subjected to $^1$H-NMR measurement (using TMS-free CDCl$_3$).

The $^1$H-NMR measurement revealed that a signal (0.01 ppm) attributed to methyl proton of a dimethylsilyl group observed before the reaction completely disappeared and absorption related to a benzylmethylene group shifted to the high magnetic field side (4.67 ppm→4.62 ppm), and hence a tert-butyldimethylsilyl group was substituted with a hydroxyl group. The conversion rate of the tert-butyldimethylsilyl group into the hydroxyl group was 100%.

Modification of terminal methacryl group of PMMA homopolymer (PMMA–(Bn)MA):
Synthesis: The inner wall of the flask was cleaned using a THF solution of DPE anion (it was confirmed that red coloration disappeared), and then 100 mL of dry THF was added to 4.0 g of PMMA-(Bn)OH synthesized in Example (2), and dissolved therein.

0.38 g (50 equivalents to the terminal) of methacryloyl chloride, 0.90 g (50 equivalents to the terminal) of diisopropyl azodicarboxylate, and 1.16 g (50 equivalents to the terminal) of triphenylphosphine were added to the solution, and the resulting mixture was allowed to react at 30° C. for 24 hours, and the reaction was quenched with a large amount of methanol.

Purification: Approximately 2.0 g of the concentrated sample was reprecipitated twice in 300 mL of methanol. The precipitate was collected and reprecipitated in 300 mL of heptane. A residual solvent and other components were removed by vacuum drying.

Measurement: A product resulting from the filtration was vacuum-dried and subjected to $^1$H-NMR measurement (using TMS-free CDCl$_3$).

The $^1$H-NMR measurement revealed that methacryl group absorption was observed around 5.50 and 6.05 ppm, at which methacryl group absorption was not observed before the reaction, and absorption related to a benzylmethylene group shifted to the low magnetic field side (4.62 ppm→5.04 ppm), and hence a hydroxyl group was substituted with a methacrylate group. The conversion rate of the hydroxyl group into the methacrylate group was 100%.

Example 2: Synthesis of Styrene Polymer Block

In a 100-mL round-bottom flask purged with argon gas, 40.0 g of toluene and 5.0 g (0.048 mol) of styrene (hereinafter, referred to as "St") were fed, and cooled to 10° C., and the resulting solution was stirred until the resulting solution was uniform. 0.25 mL (0.25 mmol) of a sec-BuLi solution (1.0 M cyclohexane solution) was added as a polymerization initiator, and, as a result, the solution turned yellow, and continuously the solution was stirred for 1 hour. Subsequently, a mixed solution of 0.05 g (0.29 mmol) of DPE and 1.0 mL of toluene was added, and the solution gradually turned red, and continuously the solution was stirred for 30 minutes to obtain a solution of styrene polymer block. A small amount of the solution was sampled and analyzed. Based on the amount of remaining monomers determined by GC, the reaction rate (polymer conversion) of St was determined to be 100%. The obtained styrene polymer block (1) had a number average molecular weight (Mn) of 19,000, a weight-average molecular weight (Mw) of 19,400, and a degree of dispersion (Mw/Mn) of 1.02.

Example 3: Synthesis of Block Copolymer

To 20.0 mL of dry THF cooled to −78° C., the styrene polymer block solution obtained in Example 2 was added little by little until the solution was confirmed to be colored in light orange (5.0 mL of the styrene polymer block solution was added in total), and then, 40.8 mL of the styrene polymer block solution obtained in Example 2 was added again. While the solution was stirred, 14.4 mL of the PMMA-(Bn)MA solution obtained in Example 1 was sampled and added little by little to the solution. The solution was continuously allowed to react for 1 hour, and then, to the solution colored in light pink on the whole, 5 mL of methanol was added to quench the reaction, whereby a solution of a block copolymer (1) was obtained.

50 mL of the solution of the block copolymer obtained in Example 3 was added dropwise to 300 mL of cyclohexane, and an unreacted styrene polymer block was removed by reprecipitation purification. The reprecipitation purification was performed twice. The obtained block copolymer had a number average molecular weight (Mn) of 56,800 and a degree of dispersion (Mw/Mn) of 1.08.

The invention claimed is:

1. A block copolymer represented by general formula (4):

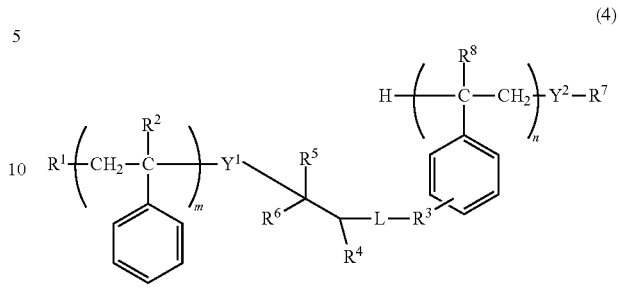

(4)

(wherein $R^1$ and $R^7$ each independently represent a polymerization initiator residue, $R^2$ and $R^8$ each independently represent an aromatic group or an alkyl group, $Y^1$ represents a polymer block of (meth)acrylic ester, $Y^2$ represents a polymer block of styrene or a derivative of styrene, $R^3$ represents an alkylene group having 1 to 6 carbon atoms, L represents a linking group, m and n each independently represent an integer from 1 to 5, $R^4$ represents a hydrogen atom, an alkyl group having 1 to 6 carbon atoms, or an aromatic group, and $R^5$ and $R^6$ each independently represent a hydrogen atom or an alkyl group having 1 to 6 carbon atoms).

2. A method for producing a block copolymer represented by a general formula:

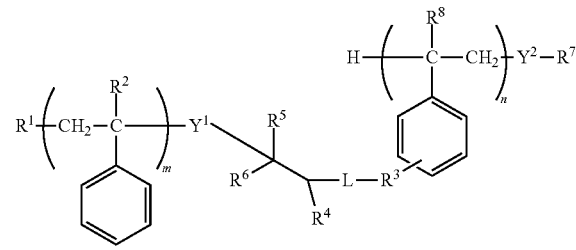

(wherein $R^1$ and $R^7$ each independently represent a polymerization initiator residue, $R^2$ and $R^8$ each independently represent a phenyl group or a methyl group, $Y^1$ represents a polymer block of (meth)acrylic ester, $Y^2$ represents a polymer block of styrene or a derivative of styrene, $R^3$ represents an alkylene group having 1 to 6 carbon atoms, L represents a linking group, m and n each independently represent an integer from 1 to 5, $R^4$ represents a hydrogen atom, an alkyl group having 1 to 6 carbon atoms, or an aromatic group, and $R^5$ and $R^6$ each independently represent a hydrogen atom or an alkyl group having 1 to 6 carbon atoms), the method comprising, using a microreactor having a channel capable of mixing a plurality of liquids or a batch reactor, reacting a polymerization initiator and diphenylethylene or methylstyrene, and then introducing a (meth)acrylic acid ester to the resultant reaction product to cause living anionic polymerization, obtaining a polymer (A), and bonding the polymer (A) and the block copolymer intermediate represented by the general formula (2)

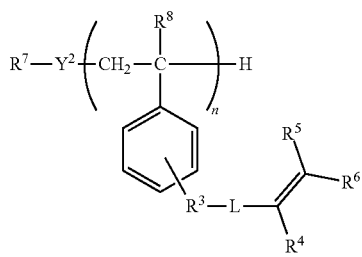 (2)

(wherein $R^7$ represents a polymerization initiator residue, $R^8$ represents a phenyl group or a methyl group, $Y^2$ represents a polymer block of styrene or a derivative of styrene, and n represents an integer from 1 to 5, $R^3$ represents an alkylene group having 1 to 6 carbon atoms, L represents a linking group, $R^4$ represents a hydrogen atom, an alkyl group having 1 to 6 carbon atoms, or an aromatic group, and $R^5$ and $R^6$ each independently represent a hydrogen atom or an alkyl group having 1 to 6 carbon atoms)
by a displacement reaction of an anionic end of the polymer (A) by $-LR^4C{=}CR^5R^6$ of the block copolymer intermediate.

3. The method for producing a block copolymer according to claim 2, wherein
the block copolymer intermediate, the intermediate being represented by the general formula (2), is obtained in a manner that
using a microreactor having a channel capable of mixing a plurality of liquids, subjecting styrene or a derivative thereof to living anionic polymerization in the presence of a polymerization initiator, and then reacting the resultant product with diphenylethylene or methylstyrene having a silyl ether alkyl group to obtain a polymer block of styrene or derivative thereof, and then displacing the silyl ether group of the diphenylethylene or the methylstyrene by $-LR^4C{=}CR^5R^6$.

* * * * *